(12) United States Patent
Harwath et al.

(10) Patent No.: US 9,601,235 B2
(45) Date of Patent: Mar. 21, 2017

(54) HYBRID CABLE WITH FLAT POWER CONDUCTORS

(71) Applicant: CommScope Technologies LLC, Hickory, NC (US)

(72) Inventors: Frank A. Harwath, Naperville, IL (US); Scott M. Adams, Catawba, NC (US); Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/341,823

(22) Filed: Jul. 27, 2014

(65) Prior Publication Data

US 2015/0034381 A1 Feb. 5, 2015

Related U.S. Application Data

(60) Provisional application No. 61/860,028, filed on Jul. 30, 2013, provisional application No. 61/897,779, filed on Jan. 6, 2014.

(51) Int. Cl.
*H01B 7/08* (2006.01)
*H01B 11/22* (2006.01)
(Continued)

(52) U.S. Cl.
CPC ......... *H01B 7/0823* (2013.01); *G02B 6/4416* (2013.01); *G02B 6/4435* (2013.01); *H01B 9/005* (2013.01)

(58) Field of Classification Search
CPC ...... H01B 7/0823; H01B 11/22; H01B 9/005; G02B 6/4416
(Continued)

(56) References Cited

U.S. PATENT DOCUMENTS 3,233,036 A 2/1966 Ludwik
3,586,757 A 6/1971 Handeman, Jr.
(Continued)

FOREIGN PATENT DOCUMENTS

CN 201364748 12/2009
CN 202142337 2/2012
(Continued)

*Primary Examiner* — Hoa C Nguyen
*Assistant Examiner* — Amol Patel
(74) *Attorney, Agent, or Firm* — Myers Bigel, P.A.

(57) ABSTRACT

A cable reduces loop inductance by changing the cross-sectional shape of the conductive elements of power supply and return conductors to something other than the traditional circular cross sectional shape, e.g., to a thin generally rectangular shape. The power supply and return conductors are also controlled in placement along the length of the cable, so that mutual inductance is maximized within a given power supply circuit, and minimized between the given power supply circuit and other power supply circuits within the cable. The return power supply conductor may optionally be sized for multiple power supply circuits, which may further reduce loop inductance and reduce crosstalk noise between different power supply circuits within a common cable. The power supply and return conductors may be part of a hybrid cable used to power and communicate with plural remote radio units proximate a top of a tower.

19 Claims, 11 Drawing Sheets

(51) Int. Cl.
*G02B 6/44* (2006.01)
*H01B 9/00* (2006.01)

(58) Field of Classification Search
USPC .............................. 174/117 R, 117 F, 117 FF
See application file for complete search history.

(56) References Cited

U.S. PATENT DOCUMENTS

| | | | |
|---|---|---|---|
| 3,795,540 A | | 3/1974 | Mildner |
| 3,828,120 A | | 8/1974 | Hansen |
| 3,941,966 A | * | 3/1976 | Schatz .................. 219/634 |
| 4,051,809 A | | 10/1977 | Zickar et al. |
| 4,219,928 A | | 9/1980 | Kuo |
| 4,241,498 A | | 12/1980 | Brandeau |
| 4,283,593 A | | 8/1981 | Piasecki et al. |
| 4,644,092 A | | 2/1987 | Gentry |
| 4,787,705 A | | 11/1988 | Shinmoto et al. |
| 4,815,814 A | | 3/1989 | Ulijasz |
| 2,200,776 A | | 5/1990 | Hoover |
| 4,973,370 A | | 11/1990 | Kreinberg |
| 5,804,768 A | | 9/1998 | Sexton |
| 5,847,324 A | | 12/1998 | Farquhar et al. |
| 6,005,193 A | * | 12/1999 | Markel .................. 174/117 FF |
| 6,045,374 A | | 4/2000 | Candeloro |
| 6,218,622 B1 | | 4/2001 | Rimmer |
| 6,256,439 B1 | | 7/2001 | Brown et al. |
| 6,340,795 B1 | | 1/2002 | Caldwell |
| 6,608,256 B2 | | 8/2003 | Suzuki et al. |
| 7,127,144 B2 | | 10/2006 | Lee |
| 7,304,246 B2 | | 12/2007 | Huffman |
| 7,346,974 B2 | | 3/2008 | Joho |
| 7,794,132 B2 | | 9/2010 | Cunius |
| 8,481,853 B2 | | 7/2013 | Sexton et al. |
| 2006/0016615 A1 | | 1/2006 | Schilson et al. |
| 2006/0180339 A1 | * | 8/2006 | Huffman ............... H01B 7/0018 174/117 FF |
| 2007/0240898 A1 | * | 10/2007 | Reichert et al. .......... 174/117 F |
| 2008/0029290 A1 | | 2/2008 | Kuo |
| 2008/0128153 A1 | * | 6/2008 | Lietz ...................... 174/117 FF |
| 2011/0155417 A1 | * | 6/2011 | Hu ................................ 174/116 |
| 2012/0043107 A1 | * | 2/2012 | Nair ............................. 174/103 |
| 2012/0181060 A1 | | 7/2012 | Chen et al. |
| 2013/0084050 A1 | * | 4/2013 | Vastmans ............... H02G 3/081 385/135 |
| 2013/0108227 A1 | | 5/2013 | Conner |

FOREIGN PATENT DOCUMENTS

| | | |
|---|---|---|
| EP | 0 097 414 A1 | 1/1984 |
| WO | WO 90/10336 | 9/1990 |

* cited by examiner

HYBRID CABLE WITH FLAT POWER CONDUCTORS

This application claims the benefit of U.S. Provisional Application No. 61/860,028, filed Jul. 30, 2013 and U.S. Provisional Application No. 61/897,779, filed Jan. 6, 2014, each of which is herein incorporated by reference.

BACKGROUND OF THE INVENTION

1. Field of the Invention

The present invention relates to a power cable having insulated conductors to present at least one power supply. More particularly, the present invention relates to a cable, which includes a plurality of insulated supply and return conductors, wherein the cross sectional shapes of one or more of the conductors is rectangular, and wherein the power cable may be used in a hybrid cable for supplying power to equipment receiving communications via communication signal carrying mediums, such as optical fibers or conductive elements, e.g., coaxial cables or twisted pairs of conductors.

2. Description of the Related Art

Figure 1:
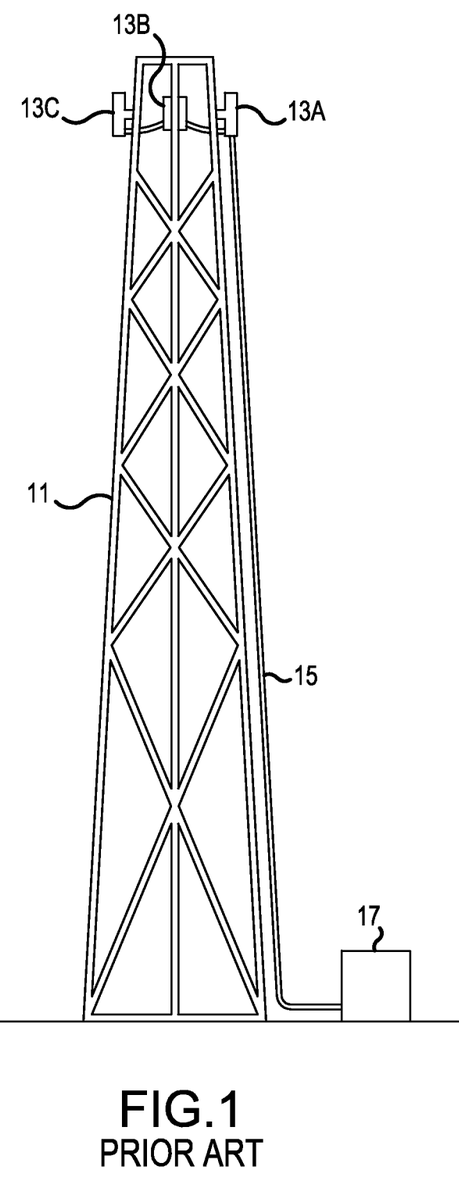
FIG. 1 is a side view of a cell tower, in accordance with the prior art.

FIG. 1 shows a cell tower 11 having a plurality of remote radio units (RRUs), sometimes referred to as remote radioheads 13, mounted at a top of the tower. A hybrid cable 15 extends from a junction box 17 at a bottom of the tower 11 to the radioheads 13, e.g. 13A, 13B, 13C, . . . , at the top of the tower 11. The hybrid cable 15 provides power and fiber optic pathways and/or electrical signal/control pathways, e.g., via twisted pairs, coaxial cables, from the junction box 17 to the remote radioheads 13, so that the remote radioheads 13 may function to establish a wireless coverage cell in a known manner.

Figure 2:
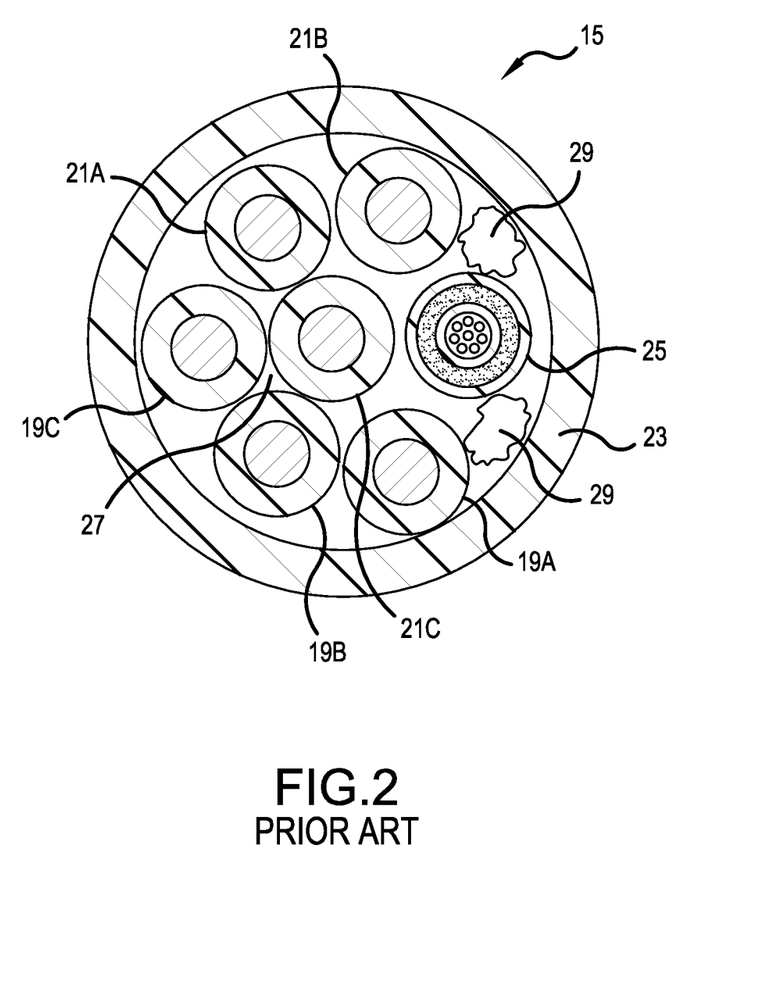
FIG. 2 is a cross sectional view of a hybrid cable, in accordance with the prior art.

Typically, power is supplied to each remote radiohead 13 by a supply conductor and a return conductor placed separately in the overall jacket of the hybrid cable 15. For example, FIG. 2 shows a cross sectional view of the hybrid cable 15 designed to supply three remote radioheads 13. The hybrid cable 15 includes a jacket 23 surrounding six power conductors, e.g., three power supply conductors 19A, 19B and 19C with red insulation and three power return conductors 21A, 21B and 21C with black or green insulation. The jacket 23 of the hybrid cable 15 may also surround one or more fiber optic cables 25 to send data to, and receive data from, the remote radioheads 13. Typically, the current carrying portions of the power supply and return conductors 19 and 21 are formed of conductive strands, e.g., copper strands, bunched into a circular cross sectional shape and surrounded by an insulation layer having an outer surface with a circular cross sectional shape. FIG. 2 illustrates the inherent air gaps, or interstices 27, formed between abutting power supply and return conductors 19 and 21 due to the outer surfaces with a circular cross sectional shape. Also, FIG. 2 illustrates that optional fillers 29 may be included within the hybrid cable 15 to fill larger void spaces between the one or more fiber optic cables 25 and the power supply and return conductors 19 and 21.

Related art may be found in the following documents, which are herein incorporated by reference: U.S. Pat. Nos. 2,200,776; 3,586,757; 4,219,928; 4,241,498; 4,283,593; 4,787,705; 4,815,814; 4,973,370; 5,804,768; 6,045,374 7,127,144; 7,304,246; 7,346,974; 7,794,132; 8,481,853; and 2003/0108227.

SUMMARY OF THE INVENTION

The Applicant has appreciated drawbacks in the cables of the prior art, which supply power to multiple devices via multiple power supply and/or return conductors. It is an object of the present invention to address one or more of the drawbacks and other perceived needs in the art.

In the hybrid cable 15 of the prior art, the physical location of each a supply conductor 19 to its return conductor 21 is not controlled. Other than having different individual jacket colors to aid in correct polarization of the termination at each end of the hybrid cable 15, e.g., red jacketed conductors 19 represent supply power and black or green jacketed conductors 21 represent returns, the conductors 19 and 21 are essentially the same. When a technician terminates the supply and return conductors 19 and 21 to a particular radiohead 13, the technician may select supply and return conductors 19 and 21 at random.

The effect of this random selection of the supply and return conductors 19 and 21 is that the proximity of a supply conductor 19 to its return conductor 21 is not controlled within the hybrid cable 15. This random proximity between the supply conductor 19 and the return conductor 21 causes at least two effects. First, the loop inductance is variable from a set minimum based on the construction of the cable to a maximum. Second, the mutual inductance between conductors of different circuits can vary in a similar manner.

For example, a 6 American wire gauge (AWG) thermoplastic high heat nylon-Coated (THHN) supply conductor 19 has an outside diameter of 6.3 mm, with a wire diameter of 4.1 mm. If the supply conductor 19 lays "beside and parallel" to its 6 AWG THHN return conductor 21 throughout the length of the hybrid cable 15, the loop inductance is about 396 nH/m. If the technician selects widely spaced supply and return conductors 19 and 21, say 20 mm apart, the loop inductance increases to about 905 nH/m.

The effect of this difference in loop inductance can be put into perspective by considering the operation of the remote radiohead 13. The remote radiohead 13 may have large fluctuations in data, which rapidly change the required RF output. This will cause a related change in the electrical load the remote radiohead 13 presents to the power supply circuit. If the remote radiohead 13 is using 2.5 A of current at 48 VDC at the end of a 100 m cable run, and then shifts to a demand of 5 A, inductive reactance will cause the voltage to sag more than just the anticipated amount caused by resistive losses.

Putting actual numbers to the above example, in a 48 VDC system, the resistive voltage drop of the supply cable at 2.5 A is 0.324V. The resistive voltage drop increases to 0.648V, when the current is increased to 5 A. At a load impedance of 9.47 ohms, the worst case reactance would cause the voltage to drop below 25V. Moreover, the voltage would stay below 43V, the minimum operating voltage, for over 16 uS. Hence, it would be necessary to add 20 uF of shunt capacitance at the load to keep the voltage from dropping below 43V. Adding capacitors and/or increasing the size/capacitance provided at the radiohead 13 adds cost and weight to the radioheads 13, and also adds another potential failure point to the power supply system.

Another issue with randomly assigning supply and return conductors 19 and 21 within the hybrid cable 15 of the prior art, as discovered by the inventors, deals with currents induced on one power circuit from transients on another power circuit. Power circuits that are not connected physically can still be affected by inductive and capacitive coupling from active circuits in their proximity. Once again, if the circuits are connected in a random fashion, a supply conductor 19 could be placed far from its return conductor 21, and at the same time be placed adjacent to the supply conductor 19 of another circuit. If the adjacent circuit experiences load fluctuations, e.g., a shift in amperage demand due to increased data throughput, the mutual inductance between the conductors of different circuits will allow some of the energy to pass from one power circuit into the adjacent different power circuit. This is commonly referred to as crosstalk.

Crosstalk is a source of noise in the system, and crosstalk can contribute to false switching under some conditions. Such errors, can lead to communication disruptions. Known techniques to reduce crosstalk, such as dielectric spacers and/or individual shielding layers within the cable core, require additional costs. Further, the added components consume space within the hybrid cable 15, add to the weight of the hybrid cable 15, and reduce the flexibility of the cable.

It is an object of the present invention to provide a cable which optimizes inductance within and between power supply circuits within the cable by changing both the cross-section of the conductive elements of the individual conductors and/or by controlling the placement configuration of the supply and return conductors along the length of the cable.

It is an object of the present invention to achieve significant reductions in loop inductance, as compared to the cables of the prior art. As discussed previously, loop inductance may be improved by controlling the placement of the supply and return conductors along the length of the cable. Further enhancements to loop inductance may be achieved through the use of conductors having rectangular cross sectional shapes. For example, mutual inductance between a "paired" supply and return conductor may be maximized by employing conductors with rectangular cross sections, as compared to conductors with round cross sections, because rectangular supply and return conductors may be placed relatively closer together. Also, the self-inductance of a rectangular conductor is lower than the self-inductance of a round conductor. Improvements in mutual inductance and self-inductance, through the use of rectangular conductors, can further improve the overall inductance performance of the cable.

Some embodiments of the present invention are applicable to cables with two or more power supply circuits within a common jacket, whether or not those cables also include one or more fiber optic cables, e.g., forming a hybrid cable.

It is an object of the present invention to reduce inductance and crosstalk between different power supply circuits within a common jacket of a cable.

It is an object of the present invention to provide a power supply cable with current carrying portions of a non-circular cross section within a hybrid cable including communication carrying mediums, such as hybrid cables installed on a cell tower.

It is an object of the present invention to provide conductors with current carrying portions of a non-circular cross section with enhanced bend abilities in a bend plane and/or twist flexibility, as compared to equivalently gauged conductors (i.e., equal current carrying capacity) having circular current carrying portions.

These and other objects are accomplished by a cable which reduces loop inductance by changing the cross-sectional shape of the conductive elements of the power supply and return conductors to something other than the traditional circular cross sectional shape, e.g., to a thin generally rectangular shape. Alternatively or in addition, the present invention provides power supply and return conductors in a controlled paired arrangement, so that mutual inductance is maximized within a given power supply circuit, and minimized between the given power supply circuit and other power supply circuits within the cable. The return power supply conductor may optionally be sized for multiple power supply circuits, which arrangement may further reduce loop inductance and reduce crosstalk noise between different power supply circuits.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 3:
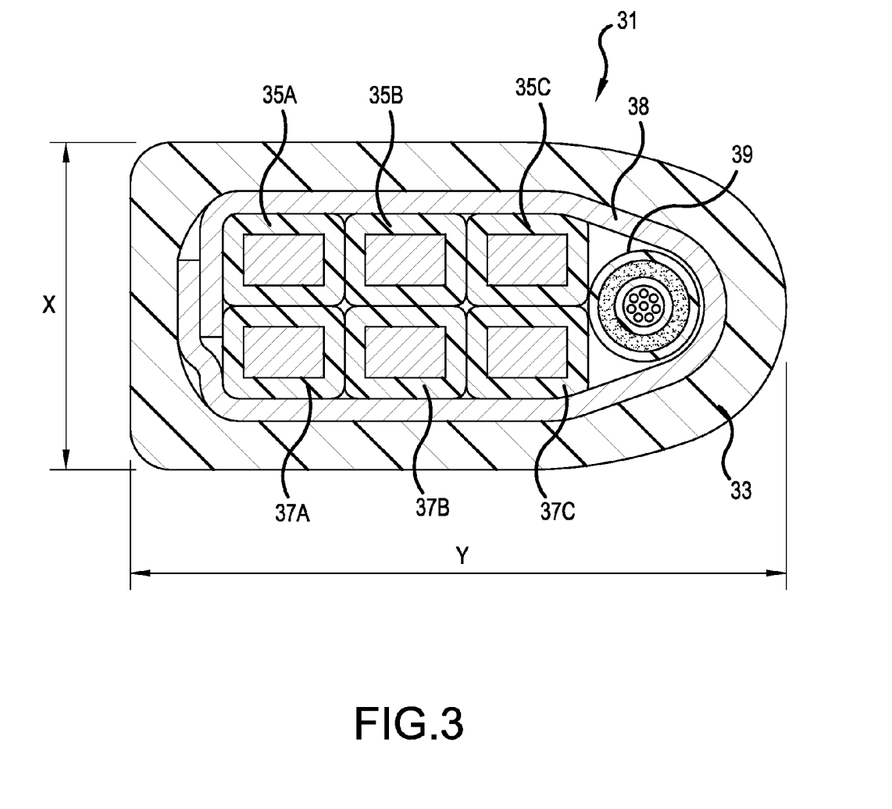
FIG. 3 is a cross sectional view of a hybrid cable, according to a first embodiment of the present invention.

FIG. 3 is a cross sectional view of a hybrid cable 31, according to a first embodiment of the present invention. In the first embodiment, an outer jacket 33 has an overall height X of about 0.740 to 0.788 inches and a width Y of about 2.40 to 2.76 inches. These dimensions are not limiting to the invention and may vary depending upon the number of insulated conductors and/or fiber optic cables within the hybrid cable 31, as well as the sizes of the insulated conductors and fiber optic cables within the hybrid cable 31, as will be explained further below with reference to alternative embodiments.

The outer jacket 33 surrounds a plurality of insulated power supply conductors 35 and a plurality of insulated power return conductors 37. In the first embodiment, the hybrid cable 31 includes first, second and third insulated power supply conductors 35A, 35B and 35C, and first, second and third insulated power return conductors 37A, 37B and 37C. The outer jacket 33 also surrounds a fiber optic cable 39. The fiber optic cable 39 may include numerous optical fibers and is but one embodiment of a communication signal carrying medium. Other types of communication signal carrying mediums may be employed such as coaxial cables and/or twisted pairs of insulated conductors.

In one embodiment, a shielding layer 38 may surround the plurality of insulated power supply and return conductors 35 and 37 and the fiber optic cable 39, with the outer jacket 33 surrounding the shielding layer 38. In a preferred embodiment, the conductive portions or current carrying portions of the plurality of insulated power supply and return conductors 35 and 37 are non-circular in cross section, such as generally rectangular in cross section. Also, in a preferred embodiment, the outer surfaces of the insulation layer of the plurality of insulated power supply and return conductors 35 and 37 are non-circular in cross section, such as generally rectangular in cross section. The generally rectangular shape of the current carrying portions provides electrical performance benefits, as further explained herein. The generally rectangular outer shape of the insulation layers allows for close and controlled packing placement of conductors within the cable core, which can provide more consistent electrical performance, and provides space savings in the cable core, which can lead to a reduced size requirement for the outer jacket 33. A smaller outer jacket 33 can potentially reduce the weight and materials required per linear foot of the hybrid cable 31. A smaller outer jacket 33 can also potentially reduce the wind load of the hybrid cable 31, as it extends up cell tower 11. Further, a substantially rectangular overall shape of the outer jacket 33 can lead to a cable having lower wind load sides (e.g., the narrower sides having dimension X in FIG. 3) and relatively higher wind load sides (e.g., the wider sides having dimension Y in FIG. 3). The hybrid cable 31 may be mounted to a bracket to take advantage of the different wind loads of the hybrid cable 31.

Figure 4:
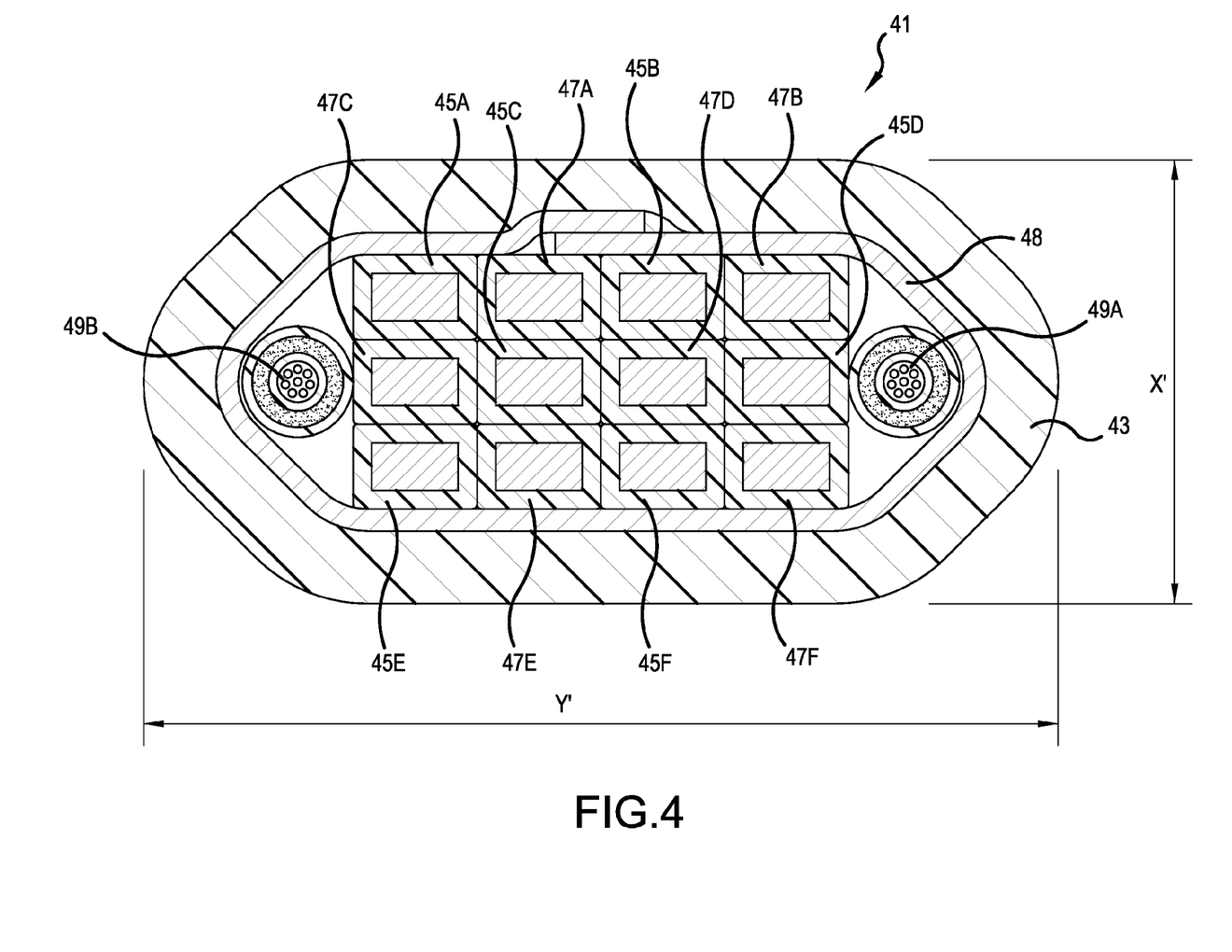
FIG. 4 is a cross sectional view of a hybrid cable, according to a second embodiment of the present invention.

FIG. 4 is a cross sectional view of a hybrid cable 41, according to a second embodiment of the present invention. In the second embodiment, an outer jacket 43 has an overall height X' of about 1.01 to 1.08 inches and a width Y' of about 3.34 to 3.82 inches. These dimensions are not limiting to the invention and may vary depending upon the number of insulated conductors and/or fiber optic cables within the hybrid cable 41, as well as the sizes of the insulated conductors and fiber optic cables within the hybrid cable 41.

The outer jacket 43 surrounds a plurality of insulated power supply conductors 45 and a plurality of insulated power return conductors 47. In the second embodiment, the hybrid cable 41 includes first, second, third, fourth, fifth and sixth insulated power supply conductors 45A, 45B, 45C, 45D, 45E and 45F, and first, second, third, fourth, fifth and sixth insulated power return conductors 47A, 47B, 47C, 47D, 47E and 47F. The outer jacket 43 also surrounds first and second fiber optic cables 49A and 49B.

In one embodiment, a shielding layer 48 may surround the plurality of insulated power supply and return conductors 45 and 47 and the fiber optic cables 49, with the outer jacket 43 surrounding the shielding layer 48. In a preferred embodiment, the conductive center portions and the outer surfaces of the insulation layers of the plurality of insulated power supply and return conductors 45 and 47 are non-circular in cross section, such as generally rectangular in cross section.

In the first and second embodiments of FIGS. 3 and 4, the insulating layer surrounding the insulated power supply and return conductors 35/37 or 45/47 is stacked in abutting relationship to the insulating layer of adjacent insulated power supply and return conductors 35/37 or 45/47. Such an arrangement increases the packing density within the hybrid cable 31/41, as compared to prior art cables having power supply and return conductors with circular cross sectional shapes. In the prior art, the conductors of circular cross sectional shapes did not contact with flush surfaces at their abutments, but rather triangular shaped interstices 27 (See FIG. 2) were formed between adjacent and abutting conductors. The interstices 27 increased the overall cross sectional size of the hybrid cable 15. Also, fillers 29 (See FIG. 2) would sometimes be employed to fill large air gaps within the cable 15. The structure of the present invention minimizes the interstices and/or air gaps, thereby reducing the overall size of the hybrid cable 31/41, and also eliminates the need for any fillers 29.

Figure 5:
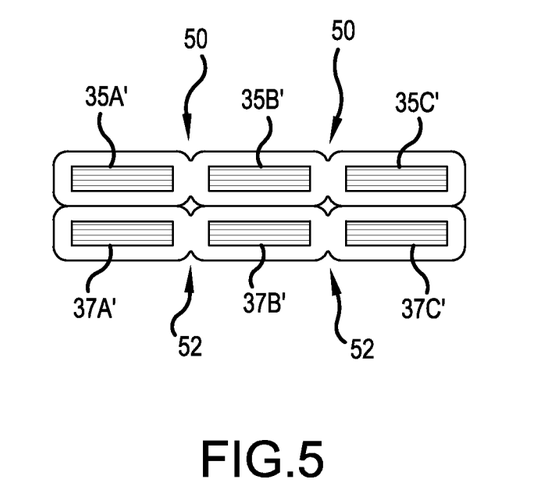
FIG. 5 is an end view illustrating optional webbing material between the insulated power supply and/or return conductors of FIG. 3.

In an alternative embodiment, the insulating layers of horizontally adjacent and/or vertically adjacent insulated power supply and return conductors 35/37 or 45/47 may be connected by a web of material which forms the insulating layers. FIG. 5 illustrates first webs 50 between horizontally adjacent insulated power supply conductors 35A', 35B' and 35C', and second webs 52 between horizontally adjacent insulated power return conductors 37A', 37B' and 37C'. The insulated power supply and return conductors 35' and 37' could be substituted into the hybrid cable 31 of FIG. 3 if desired, and the arrangement of the conductors 35' and 37' would be more controlled and consistent within the hybrid cable 31 along the entire length of the hybrid cable 31.

Figure 6:
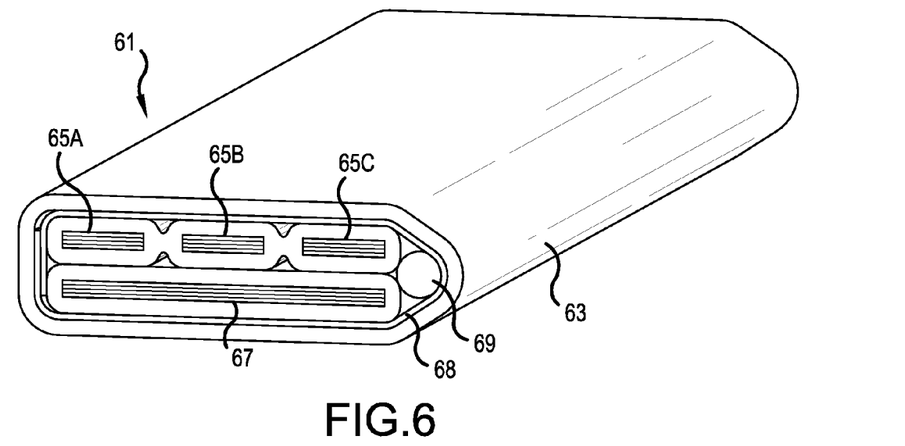
FIG. 6 is a perspective view of an end of a hybrid cable, according to a third embodiment of the present invention.

FIG. 6 is a perspective view of an end of a hybrid cable 61, according to a third embodiment of the present invention. In the third embodiment, an outer jacket 63 surrounds a plurality of insulated power supply conductors 65 and a single, common insulated power return conductor 67. In the third embodiment, the hybrid cable 61 includes first, second and third insulated power supply conductors 65A, 65B and 65C, and an insulated power return conductor 67. The insulated power return conductor 67 is larger in cross sectional area as compared to either of the first, second or third power supply conductors 65A, 65B or 65C, such as at least three times larger in cross sectional area. The outer jacket 63 also surrounds a fiber optic cable 69.

In one embodiment, a shielding layer 68 may surround the plurality of insulated power supply and return conductors 65 and 67 and the fiber optic cable 69, with the outer jacket 63 surrounding the shielding layer 68. In a preferred embodiment, the conductive center portions of the plurality of insulated power supply and return conductors 65 and 67 are non-circular in cross section, such as generally rectangular in cross section. Also, the first, second and third insulated power supply conductors 65A, 65B and 65C are joined by webs of insulation material, like webs 50 in FIG. 5.

Figure 7:
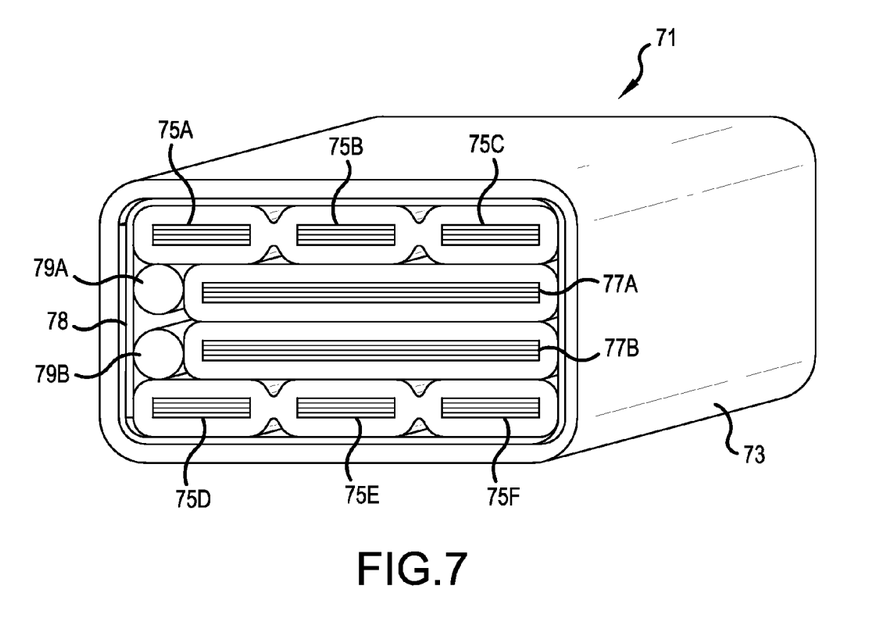
FIG. 7 is a perspective view of an end of a hybrid cable, according to a fourth embodiment of the present invention.

FIG. 7 is a perspective view of a hybrid cable 71, according to a fourth embodiment of the present invention. In the fourth embodiment, an outer jacket 73 surrounds a plurality of insulated power supply conductors 75 and a plurality of insulated power return conductors 77. In the fourth embodiment, the hybrid cable 71 includes first, second, third, fourth, fifth and sixth insulated power supply conductors 75A, 75B, 75C, 75D, 75E and 75F, and first and second insulated power return conductors 77A and 77B. As with the third embodiment, the power return conductors 77A and 77B are over-sized, so as to handle the return current of multiple power supply conductors 75. The over-sizing may be in the same ratio as the embodiment of FIG. 6, e.g., three to five times the cross-sectional area of a single power supply conductor 75. The outer jacket 73 also surrounds first and second fiber optic cables 79A and 79B.

In one embodiment, a shielding layer 78 may surround the plurality of insulated power supply and return conductors 75 and 77 and the fiber optic cables 79, with the outer jacket 73 surrounding the shielding layer 78. In a preferred embodiment, the conductive center portions of the plurality of insulated power supply and return conductors 75 and 77 are non-circular in cross section, such as generally rectangular in cross section. The first, second and third insulated power supply conductors 75A, 75B or 75C may optionally be joined by webs of insulation material, as illustrated. Also, the third, fourth and fifth insulated power supply conductors 75D, 75E and 75F may optionally be joined by webs of insulation material, as illustrated.

Although the conductive portions are shown as being generally rectangular, with "generally rectangular" being defined as including a rectangle with sharp corners, as well as a rectangular shape with radiuses at one or more of the four corners. One or more of the benefits of the present invention may be achievable when employing other non-circular cross sectional shapes, such as square, elliptical or triangular. In a preferred embodiment, the generally rectangular shape of a conductive portion forms a thin, rather flat, rectangle, with the width of the conductive portion being at least about 1.5 times greater than the height of the conductive portion, more preferably at least 2 times greater than the height, such as about 4 times greater than the height. Further, in a preferred embodiment, the conductor is formed of plural stacked layers of conductive materials (e.g., plates or strands), although an embodiment with a single, monolithic or solid conductor is within the purview of the present invention.

In one embodiment, the conductive materials are formed of aluminum. However, other conductive metals or alloys may be used, such as copper. In a preferred embodiment, the plural stacked layers include at least three layers, e.g., four layers, as illustrated in FIGS. 5-7.

Figure 8:
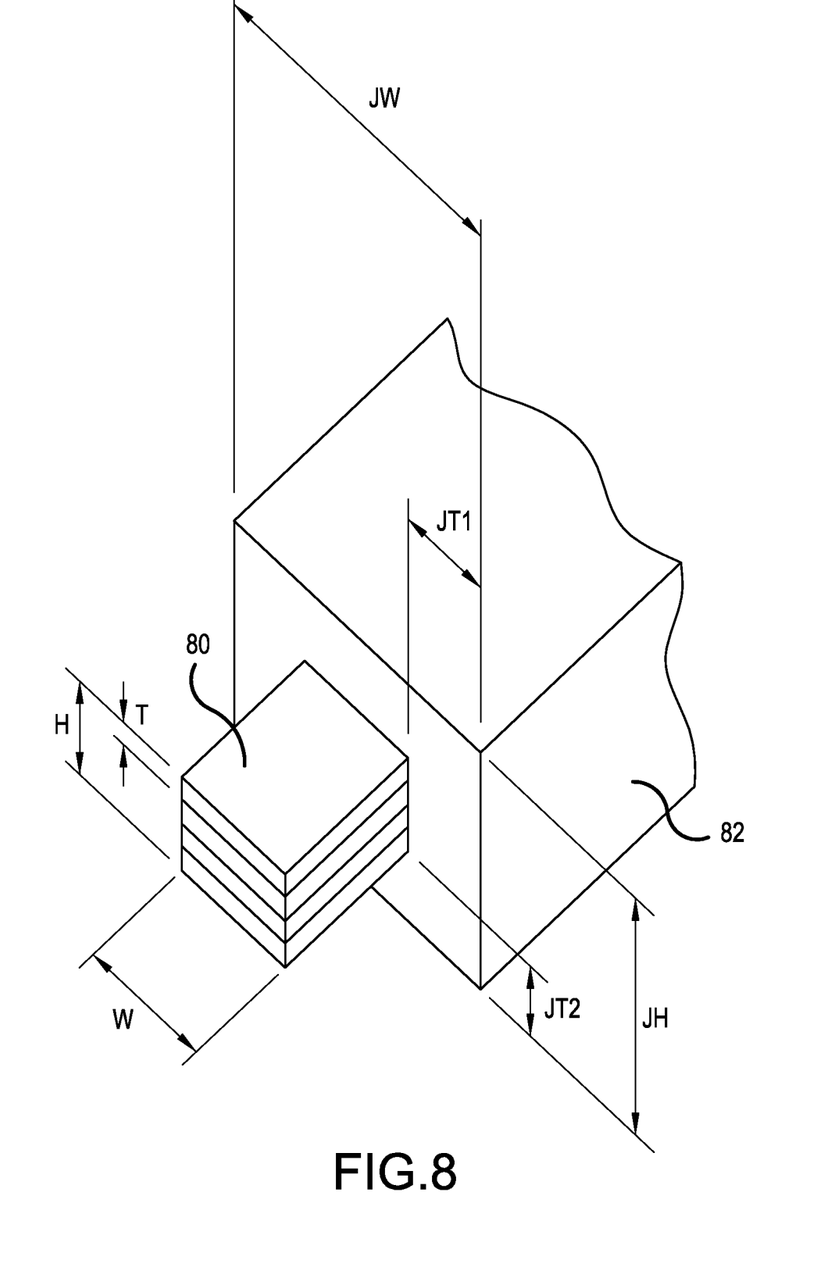
FIG. 8 is a diagram illustrating dimensions of plates forming thin rectangular conductive elements and dimensions of insulation layers of the power supply and/or return conductors.

FIG. 8 is a perspective end view of one of the power supply conductors including four stacked layers of conductors. FIG. 8 illustrates dimensions for the various features of a power supply conductor formed with four layers of aluminum plates. In FIG. 8, JW is a jacket width, JH is a jacket height, JT1 is a first jacket thickness (taken in the horizontal direction), which may be the same on both the right and left sides of the stacked conductive layers in FIG. 8, and JT2 is a second jacket thickness (taken in the vertical direction), which may be the same on both the top and bottom of the stacked conductive layers in FIG. 8. In FIG. 8, each conductive layer has a width W and a thickness T. The four stacked conductive layers have a combined height H, which is equal to 4T in FIG. 8, since FIG. 8 illustrates four conductive layers.

Using the dimension labels above, one can produce a power supply conductor with a current carrying capacity substantially equaling a four American Wire Gauge (AWG) round cross sectional aluminum (AL) insulated conductor by imposing the approximate dimensions: W=0.410, H=0.080, T=0.020, JW=0.590, JH=0.240, and JT1=JT2=0.080, with each dimension being in inches. One can produce a power supply conductor with a current carrying capacity substantially equaling a two AWG round cross sectional AL insulated conductor by imposing the approximate dimensions: W=0.530, H=0.104, T=0.026, JW=0.690, JH=0.264, and JT1=JT2=0.080, with each dimension being in inches. More details concerning the construction of the conductors may be found in the Assignee's co-pending U.S. application Ser. No. 13/561,115, filed Jul. 30, 2012, the entire contents of which are herein incorporated by reference. Conductors formed of solid flat layers do not require expensive stranding equipment to manufacture, as do the stranded power supply and return conductors 19 and 21 of the background art having a circular cross section, as depicted in FIG. 2. Also, the increased surface area per unit volume of the rectangular conductors of the present invention reduces temperature rise of the conductors during use. This allows the use of less conductive material for a given current rating. The reduced conductive material used in the hybrid cables 31/41/61/71 results in reduced manufacturing materials cost and reduced overall weight per linear foot of hybrid cable 31, 41, 61 and 71.

Although the conductive portions of the power supply and return conductors have thus far been illustrated as being formed of stacked flat plates, it is within the purview of the present invention to employ conductors formed of numerous conductive strands, assembled into a form presenting a generally rectangular cross sectional shape. FIGS. 9-19 illustrate various embodiments of such power supply and return conductors. The embodiments of FIGS. 9-19 could have the same or similar size dimensions, as described in conjunction with FIG. 8, could be substituted within the hybrid cables 31, 41, 61 and 71, and would offer similar performance characteristics to the hybrid cables 31, 41, 61 and 71, e.g., better electrical performance, reduced conductive material, compact stacking within the cable core (minimizing air gaps) and the elimination of fillers (leading to a reduced size and weight per linear unit of the overall hybrid cable 31, 41, 61, 71). However, the conductive strands in the embodiments of FIGS. 9-19 could offer further improvements in the bend moments or twisting abilities, e.g., less force required to perform a bend or twist of the cable, as compared to the cable embodiments employing stacked flat conductive layers.

Figure 9:
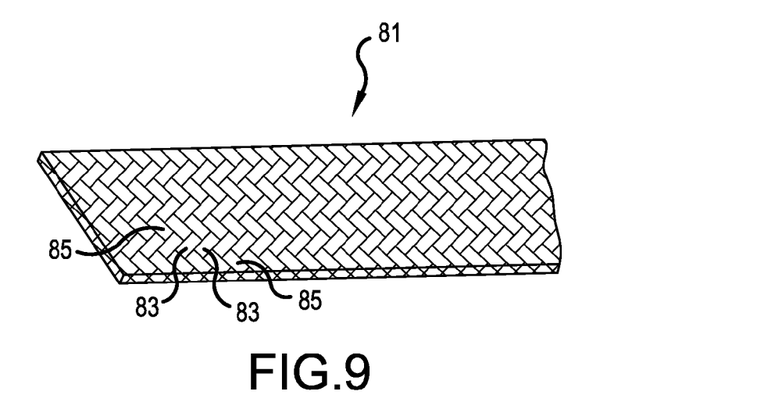
FIG. 9 is a perspective view of a current carrying element formed as a flat braid.
Figure 9A:
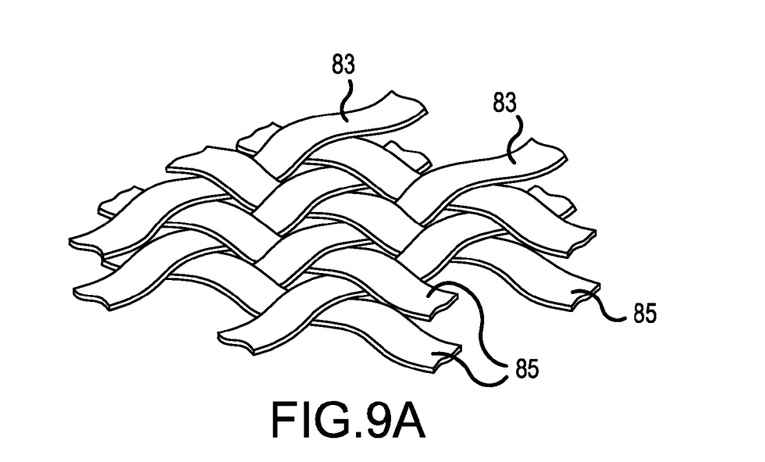
FIG. 9A is a close up view of the flat braiding within in the current carrying element of FIG. 9.

FIG. 9 shows a current carrying element 81 formed as a flat braid having a generally rectangular cross sectional shape. As best depicted in the close up view of FIG. 9A, the flat braid includes a plurality of conductive strands 83 and 85 braided together. The current carrying element 81 may be dimensioned the same as the combined four stacked plates of FIG. 8 and substituted as the current carrying element for any of the insulated power supply and return conductors of the above embodiments.

Figure 10:
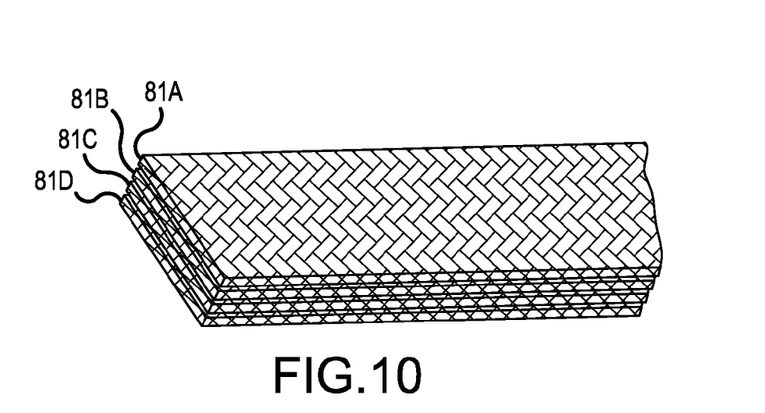
FIG. 10 is a perspective view of four flat braided current carrying elements stacked upon each other.

In a preferred embodiment, as depicted in FIG. 10, four of the current carrying elements 81A, 81B, 81C and 81D are stacked upon each other. Each of the current carrying elements 81A, 81B, 81C and 81D is dimension substantially the same as one of the plate-shaped current carrying elements of FIG. 8.

Figure 11:
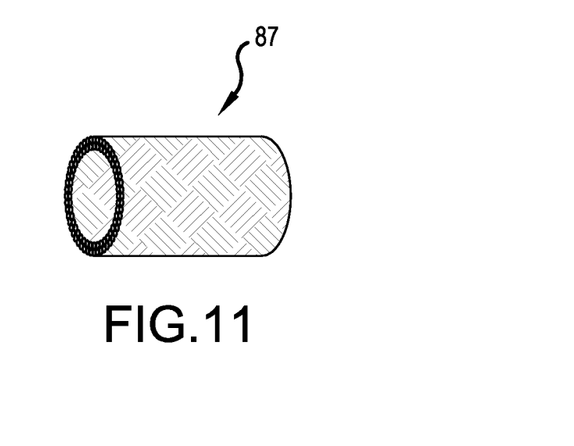
FIG. 11 is a perspective view of a tubular braid.
Figure 11A:
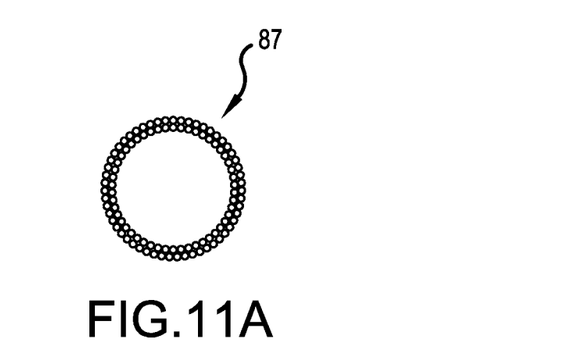
FIG. 11A is an end view of the tubular braid of FIG. 11.
Figure 12:
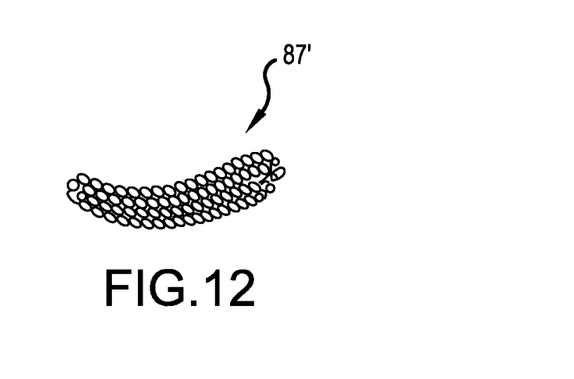
FIG. 12 is an end view of a flattened tubular braid.

FIG. 11 depicts a perspective view of a tubular braid 87, and FIG. 11A is an end view of the tubular braid of FIG. 11. The tubular braid 87 is well known in the cabling art, such as a conductive shielding layer of a coaxial cable. As depicted in the end view of FIG. 12, the tubular braid 87 may be crushed, e.g., by a cold-rolling machine, into a flat stranded conductor 87' having stacks of conductive strands, such as stacks comprising three or four or more rows of conductive branded strands formed into a generally rectangular cross sectional shape. The stack of conductive strands may be dimensioned the same as the four stacked plates of FIG. 8 and substituted for the conductive plates within the insulation layer to form the current carrying element for any of the insulated power supply and return conductors of the above embodiments.

Figure 13:
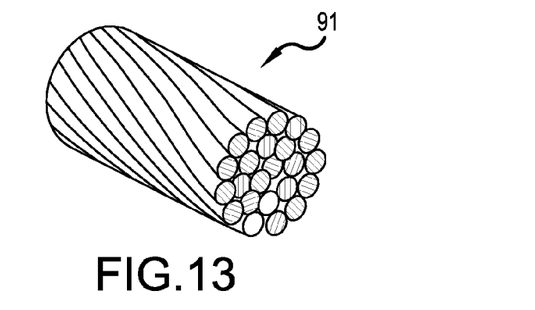
FIG. 13 is a perspective view of a stranded conductor.
Figure 14:
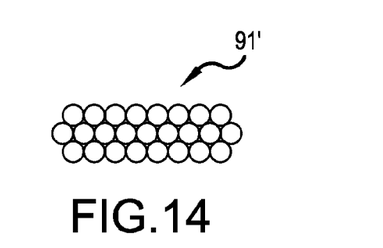
FIG. 14 is an end view of a flattened stranded conductor.

FIG. 13 depicts a perspective view of a stranded conductor 91. As depicted in the end view of FIG. 14, the stranded conductor 91 may be crushed, e.g., by a cold-rolling machine, into a flat stranded conductor 91'. The pressing process will move and deform conductive strands into a stack of conductive strands, such as a stack comprising three or four or more rows of conductive strands formed into a generally rectangular cross sectional shape. The stack of conductive strands may be dimensioned the same as the four stacked plates of FIG. 8 and substituted as the current carrying element for any of the insulated power supply and return conductors of the above embodiments.

Figure 15:
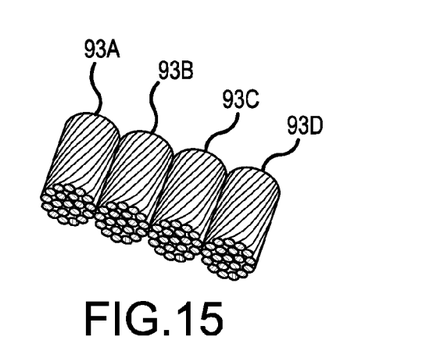
FIG. 15 is a perspective view of a first set of stranded conductors.
Figure 16:
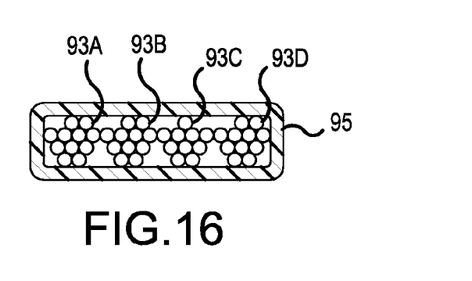
FIG. 16 is an end view of the stranded conductors of FIG. 15 within an insulation layer.
Figure 17:
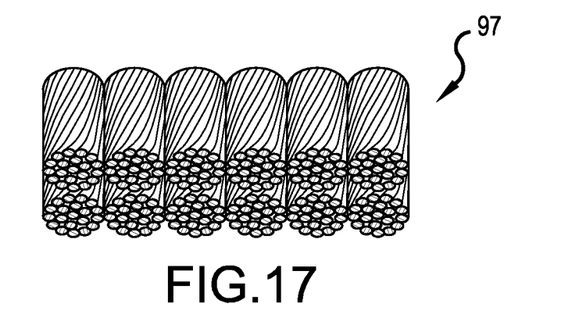
FIG. 17 is a perspective view of a second set of stranded conductors.

FIG. 15 depicts a perspective view of a plurality of adjacent stranded conductors 93A, 93B, 93C and 93D. As depicted in FIG. 16, the stranded conductors 93A, 93B, 93C and 93D are encased within an insulation layer 95, e.g., by an extrusion process. The plurality of stranded conductors 93A, 93B, 93C and 93D estimate a generally rectangular cross sectional shape. Of course, the estimate of the generally rectangular cross sectional shape can be improved by decreasing the cross sectional sizes of the plurality of stranded conductors and adding more stranded conductors. For example, FIG. 17 depicts two rows of stranded conductors 97 stacked on top of each other, with six stranded conductors 97 in each row. The stack of stranded conductors 97, depicted in FIG. 17, may be dimensioned the same as the four stacked plates of FIG. 8, and substituted as the current carrying element for any of the insulated power supply and return conductors of the above embodiments.

Figure 18:
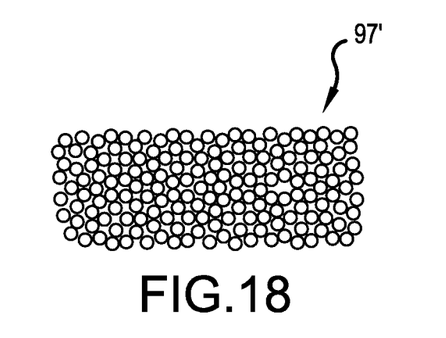
FIG. 18 is an end view of the stranded conductors of FIG. 15 after a flattening operation.

As depicted in FIG. 18, the parallel stranded conductors 97 of FIG. 17 may be flattened or crushed, e.g., by a cold-rolling machine, into a flat stranded conductor 97'. The pressing process will move and deform conductive strands into a compacted stack of conductive strands. The stack of conductive strands may be dimensioned the same as the four stacked plates of FIG. 8 and substituted as the current carrying element for any of the insulated power supply and return conductors of the above embodiments.

Figure 19:
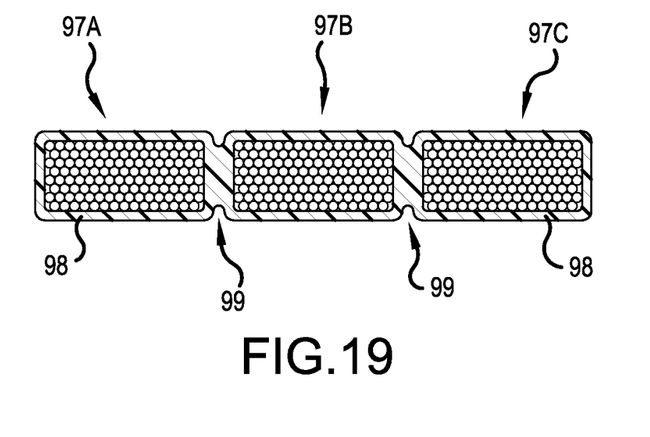
FIG. 19 is an end view of three of the flattened stranded conductors of FIG. 18 within insulation layers, which are connected by webs.

FIG. 19 shows three of the flat conductors 97' of FIG. 18, configured as first, second and third flat conductors 97A, 97B and 97C. The conductors 97A, 97B and 97C are encased within insulation layers 98, e.g., by an extrusion process. Similar to the arrangement depicted in FIG. 5, the insulating layers 98 of horizontally adjacent insulated power supply and return conductors may be connected by a web 99 of the material which forms the insulating layers 98. The webs 99 assist in controlling the placement of the power supply and return conductors within the cable along the entire length of the cable.

In preferred embodiments, the outer jackets 33, 43, 63 or 73 are formed of PVC or some other dielectric material common to the cabling arts, and has a radial thickness of about 0.1 inches. However, other thicknesses are within the purview of the present invention, such as thicknesses between about 0.05 inches to about 0.2 inches.

In preferred embodiments, the shielding layers 38, 48, 68 and 78 are formed of corrugated aluminum. In one embodiment, the corrugated aluminum shielding may be formed of an aluminum strip having a thickness of about 0.012 inches and an ethylene acrylic acid (EAA) coating on each side of the aluminum strip. As taught in U.S. Pat. Nos. 3,233,036 and 3,795,540, ethylene acrylic acid (EAA) copolymer, bonds well to the metal and seals the metal shielding layer to provide corrosion protection to the metal shielding layer.

In a preferred embodiment, each coating layer has a thickness of about 0.002 inches, resulting in an overall thickness of about 0.016 inches when a coating is applied to each side of the aluminum strip. The coated strip is then corrugated to create an armor, or shielding layer having a thickness of about 0.030 inches. The overlap of the shielding layers 38, 48, 68 and 78, as depicted in FIGS. 3, 4, 6 and 7, respectively, may optionally be bonded by an adhesive and/or heat.

In the above embodiments, commercially available fiber optic cables 39, 49A, 49B, 69, 79A and 79B may be used, such as CommScope's fiber optic cable, sold under product number 760091785, which is an indoor/outdoor, mini single jacket, all-dielectric, low smoke zero halogen (LSZH), riser-rated, gel-filled, stranded loose tube cable, which includes seventy-two fibers divided into twelve subunits within the cable.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A cable comprising:
   a first insulated power supply conductor;
   a first insulated power return conductor;
   a second insulated power supply conductor;
   a second insulated power return conductor;
   a fiber optic cable; and
   an outer jacket surrounding said first insulated power supply and return conductors, said second insulated power supply and return conductors, and said fiber optic cable, wherein said first insulated power supply and return conductors and said second insulated power supply and return conductors each include a current carrying portion which is generally rectangular in cross section with a height H and a width W, and is formed by a plurality of stacked layers of conductive materials, abutting to each other along a length of the cable;
   wherein the first insulated power supply conductor and the first insulated power return conductor are arranged in said outer jacket such that said first insulated power supply conductor and said first insulated power return conductor abut each other with flush planar surfaces, wherein said second insulated power supply conductor and said second insulated power return conductor are arranged in said outer jacket such that said second insulated power supply conductor and said second insulated power return conductor abut each other with flush planar surfaces, and wherein said fiber optic cable is arranged in said outer jacket such that said fiber optic cable abuts at least one of said insulated power supply conductors and one of said insulated power return conductors.

2. The cable of claim 1, further comprising:
   a third insulated power supply conductor; and
   a third insulated power return conductor, wherein said third insulated power supply and return conductors are surround by said outer jacket, wherein said third insulated power supply and return conductors are generally rectangular in cross section, and wherein said second insulated power supply conductor abuts said first power supply conductor and abuts said third insulated power supply conductor.

3. The cable of claim 2, wherein said fiber optic cable comprises a first fiber optic cable, said cable further comprising:
   a second fiber optic cable disposed within said outer jacket.

4. The cable of claim 3, further comprising:
   a shielding layer surrounding said first insulated power supply and return conductors, said second insulated power supply and return conductors and said third insulated power supply and return conductors, and wherein said outer jacket surrounds said shielding layer.

5. The cable of claim 1, wherein said plurality of stacked layers of conductive materials comprises at least three conductive plates, wherein a thickness of each plate is T and the height H of said current carrying portion is equal to a number of conductive plates times T.

6. The cable of claim 5, wherein said at least three conductive plates are formed of aluminum, wherein said at least three conductive plates equals four conductive plates, and the height H of said current carrying portion is equal to 4T.

7. The cable of claim 1, wherein said plurality of stacked layers of conductive materials comprises at least three layers, with each layer including a plurality of conductive strands.

8. The cable of claim 1, wherein each layer of said plurality of stacked layers of conductive materials is formed by plural conductive strands.

9. The cable of claim 8, wherein at least some of said plural conductive strands are braided together.

10. The cable of claim 1, wherein said first and second insulated power supply conductors are joined by a first web of insulation material, and said first and second insulated power return conductors are joined by a second web of insulation material.

11. A cable comprising:
   a fiber optic cable;
   a first insulated power supply conductor;
   a second insulated power supply conductor;
   a first insulated power return conductor; and
   an outer jacket surrounding said first and second insulated power supply conductors, said fiber optic cable, and said first insulated power return conductor, wherein said first and second insulated power supply conductors and said first insulated power return conductor each have a current carrying portion which is non-circular in cross section, wherein said current carrying portion of said first insulated power return conductor is larger in cross sectional area as compared to either of said current carrying portions of said first or second insulated power supply conductors, and wherein said first insulated power return conductor is insulated separately from said first and second insulated power supply conductors wherein said first insulated power supply conductor and said first insulated power return conductor are arranged in said outer jacket such that said first insulated power supply conductor and said first insulated power return conductor abut each other with flush planar surfaces, wherein said second insulated power supply conductor and said first insulated power return conductor are arranged in said outer jacket such that said second insulated power supply conductor and said first insulated power return conductor abut each other with flush planar surfaces, and wherein said fiber optic cable is arranged in said outer jacket such that said fiber optic cable abuts at least one of the insulated power supply conductors and said first insulated power return conductor.

12. The cable of claim 11, further comprising:

a third insulated power supply conductor, wherein said third insulated power supply conductor is surround by said outer jacket and wherein said current carrying portions of said first, second and third insulated power supply conductors are generally rectangular in cross section.

13. The cable of claim 12, wherein said first, second and third insulated power supply conductors are joined by webs of insulation material.

14. The cable of claim 11, further comprising:

a communication signal carrying medium different from said fiber optic cable disposed within said outer jacket.

15. The cable of claim 14, wherein said current carrying portion of said first insulated power supply conductor is formed in a generally rectangular shape, as viewed in cross section, by a plurality of stacked layers of conductive materials.

16. The cable of claim 11, further comprising:

third, fourth, fifth and sixth insulated power supply conductors; and a second insulated power return conductor, wherein said third, fourth, fifth and sixth insulated power supply conductors and said second insulated power return conductor are surround by said outer jacket and wherein said third, fourth, fifth and sixth insulated power supply conductors and said second insulated power return conductor each have a current carrying portion which is non-circular in cross section.

17. The cable of claim 16, further comprising:

first and second fiber optic cables disposed within said outer jacket.

18. A cable comprising:

a fiber optic cable;

a first insulated power supply conductor;

a second insulated power supply conductor;

a first insulated power return conductor; and an outer jacket surrounding said first insulated power supply and return conductors, said fiber optic cable, and said second insulated power supply conductor, wherein said first insulated power supply and return conductors and said second insulated power supply conductor each include a current carrying portion which is generally rectangular in cross section with a height H and a width W, and is formed by a plurality of stacked layers of conductive materials, abutting to each other along a length of the cable, and wherein said current carrying portion of said first insulated power return conductor is larger in cross sectional area as compared to either of said current carrying portions of said first or second insulated power supply conductors, and wherein said first insulated power return conductor is insulated separately from said first and second insulated power supply conductors;

wherein said first insulated power supply conductor and said first insulated power return conductor are arranged in said outer jacket such that said first insulated power supply conductor and said first insulated power return conductor abut each other with flush planar surfaces, wherein said second insulated power supply conductor and said first insulated power return conductor are arranged in said outer jacket such that said second insulated power supply conductor and said first insulated power return conductor abut each other with flush planar surfaces, and wherein said fiber optic cable is arranged in said outer jacket such that said fiber optic cable abuts at least one of the insulated power supply conductors and said first insulated power return conductor.

19. The cable of claim 18, wherein said first and second insulated power supply conductors are joined by a web of insulation material.

* * * * *